US012812365B2

(12) United States Patent
Leite Gomes et al.

(10) Patent No.: US 12,812,365 B2
(45) Date of Patent: Nov. 24, 2026

(54) PRIVACY-PROTECTED DATA BROADCAST FROM USER DEVICE

(71) Applicant: Lenovo (Singapore) Pte. Ltd., Singapore (SG)

(72) Inventors: Denis Leite Gomes, Aampinas/SP (BR); Igor Stolbikov, Apex, NC (US); Scott Wentao Li, Cary, NC (US); Rafael Rodrigues Machado, Sorocaba (BR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 425 days.

(21) Appl. No.: 18/194,419

(22) Filed: Mar. 31, 2023

(65) Prior Publication Data

US 2024/0334182 A1 Oct. 3, 2024

(51) Int. Cl.
*H04W 12/02* (2009.01)
*H04W 8/00* (2009.01)
*H04W 12/00* (2021.01)

(52) U.S. Cl.
CPC .......... *H04W 12/02* (2013.01); *H04W 8/005* (2013.01); *H04W 12/009* (2019.01)

(58) Field of Classification Search
CPC ... H04W 12/02; H04W 8/005; H04W 12/009; G06F 21/6245; G06F 21/6254; G06F 21/602
See application file for complete search history.

(56) References Cited

U.S. PATENT DOCUMENTS

2012/0221388 A1* 8/2012 Ross .................... G06Q 10/00 705/14.25
2013/0046634 A1* 2/2013 Grigg .................... G06Q 30/00 705/14.58
2014/0095313 A1* 4/2014 Casso ................ G06F 21/6209 705/14.58
2014/0310062 A1* 10/2014 Klein ................ G06Q 30/0203 705/7.32
2016/0323247 A1* 11/2016 Stein ..................... G06Q 20/02
2017/0011229 A1* 1/2017 Jones-McFadden ........................ G06F 3/04842
2017/0026782 A1* 1/2017 Gold ....................... H04W 4/80
2017/0352068 A1* 12/2017 Dominguez .......... H04W 8/005
2018/0053200 A1* 2/2018 Cronin ................... G16H 20/30
2022/0076296 A1* 3/2022 Sandoval ........... G06Q 30/0257
(Continued)

FOREIGN PATENT DOCUMENTS

WO WO-2021142429 A1 * 7/2021 .......... G06F 21/602

OTHER PUBLICATIONS

Ioannis Chatzigiannakis et. al. "Elliptic Curve Based Zero Knowledge Proofs and their Applicability on Resource Constrained Devices" IEEE Xplore Nov. 14, 2011 (Year: 2011).*

*Primary Examiner* — Wesley L Kim
*Assistant Examiner* — Erkin Abdullaev
(74) *Attorney, Agent, or Firm* — Schwegman Lundberg & Woessner, P.A.

(57) ABSTRACT

A method includes detecting presence of a user device within a proximity of a geographical location. The method includes requesting user data by providing an incentive to a user of the user device to provide user data. The method includes aggregating the user data with data of other user devices to generate an anonymous set of user data. The method includes providing a service to a user of the user device in response to receiving the user data.

3 Claims, 4 Drawing Sheets

(56) References Cited

U.S. PATENT DOCUMENTS

| | | | | |
|---|---|---|---|---|
| 2022/0207182 | A1* | 6/2022 | Bradshaw | H04L 9/3066 |
| 2023/0070824 | A1* | 3/2023 | Korwin-Gajkowski | H04L 63/0428 |
| 2023/0254136 | A1* | 8/2023 | Stewart | H04L 9/50<br>713/150 |

* cited by examiner

PRIVACY-PROTECTED DATA BROADCAST FROM USER DEVICE

TECHNICAL FIELD

Embodiments described herein generally relate to anonymizing data broadcast from user devices. In an embodiment, the user devices are wearable devices.

BACKGROUND

User devices, and in particular wearable user devices, can gather measurements or other data of a user for use in health applications and other similar applications. However, this information is often only used by the user themselves because users have elevated privacy concerns with such data. In most systems available today some companies, including wearable device vendors, have not provided effective and trusted systems and methods for keeping sensitive data private when such data is shared or broadcast. Some users may be willing to share their personal data in exchange for commercial advantages or other advantages, but privacy concerns remain.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
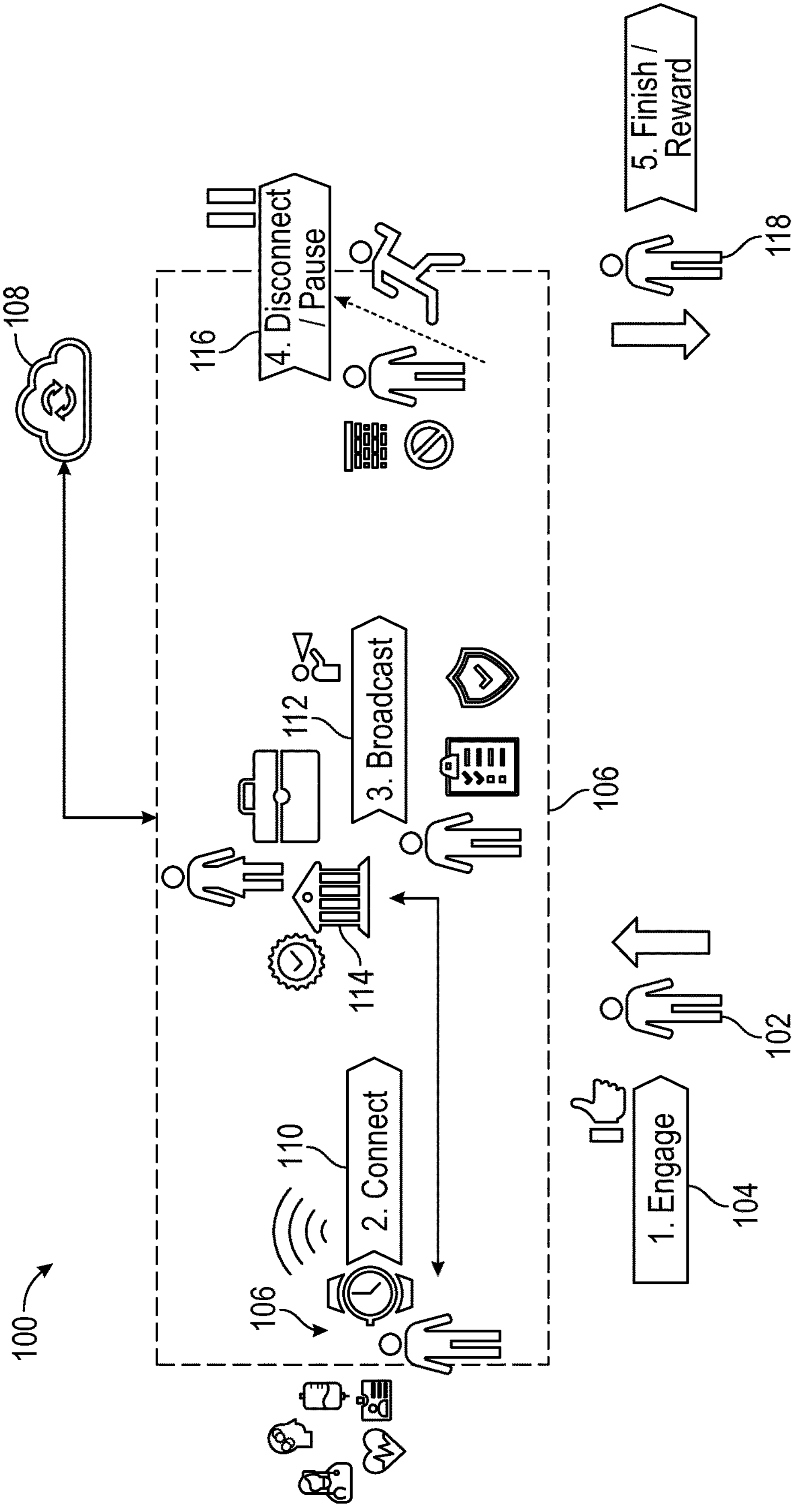
FIG. 1 is a high-level diagram of a system in which example embodiments may be implemented.

Computing devices, and particularly wearable user devices, can gather and store user information that is typically kept private to the user or used on device applications. Some of the user devices discussed herein can include wearable devices, although embodiments are not limited thereto. It is expected that use of wearable devices will grow in the future, and that even greater numbers of devices may become available.

However, data and functionality provided by these devices is often limited to use by the user or owner themselves. Users may understandably be reluctant to share this data because there is little upside to sharing this data when balanced with privacy concerns. Use of such data may be limited by jurisdictional privacy laws. However, many users may be willing to share user data in exchange for commercial advantages such as a better service, product customization or some discount, bonus, or other reward.

Some available solutions address this concern by using indirect methods to gather user data from user devices such as wearable devices. Wearable devices used or described according to embodiments include, but are not limited to: headbands, sociometric badges, camera clips, smart watches, and sensors embedded in clothing worn by the user. Wearable devices can include sensors such as accelerometers, altimeters, digital cameras, or other image capturing circuitry, electrocardiogram devices, electromyograph devices, electroencephalogram (EEG) devices, electrodermograph devices, location sensors (e.g., global positioning system (GPS)), microphones, oximeters, Bluetooth proximity sensors or other proximity sensors, atmospheric pressure sensors, thermometers, etc. Parameters captured can include related physical or biological data of the user and parameters related to the user's environment such as temperature, ambient light, location, relative position, speed, noise, etc. Parameters can also include personal user preferences, which may be collected interactively through "quizzes" e.g., audio quizzes, calls, etc. These responses can be provided through audio recordings or gestures. For example, the user may share his or her taste, preferred color, opinion, and other forms of textual feedback.

Wearable sensors can be comprised of materials and substrates including natural materials, synthetic polymers, hydrogels, and inorganics and can make use of electrodes including materials such as metal, carbon-based materials, or hydrogels. These and other devices can provide health solutions to the user. Some devices can include or communicate with decision-making units including data conversion units, data processing units, data transmission units, and data storage units and can incorporate local power or harvest power from the user's biological functions.

Methods according to example embodiments can include client application metadata analysis, interactive smartphone push notifications, and quick response (QR) code-scanned form filling or direct surveying, e.g., automatic self-service stations, etc. However, these methods are inefficient and time-consuming. Furthermore, privacy concerns can remain because available systems offer insufficient privacy controls that rely on the standard enterprise privacy controls, which known to be insufficient.

Systems according to embodiments of the present disclosure can provide a privacy-protecting broadcasting method for users of devices, in particular wearable devices. The broadcast described herein can anonymize data using aggregated zero-knowledge values in the form of elliptic curve cryptography (ECC) arithmetic circuits or algebraic intermediate representations (AIRs). Users may agree with sharing and broadcasting their collected anonymized user data in exchange for special conditions or benefits provided by surrounding businesses/institutions interested in utilizing such data to understand citizen/customer behavior better or improve their services.

Embodiments of the present disclosure trying to connect the privacy need of the user and also the possibility of businesses harnessing this data that is being generated. A huge amount of data is being generated and not being used because of such privacy protecting acts and laws.

FIG. 1 is a high-level diagram of a system 100 in which example embodiments may be implemented. The user 102 can enter a relationship with an institution at operation 104 by, for example, entering a physical location 106 (e.g., retail store) either by entering the location 106 or by interacting using an application on a user device. In the context of embodiments, an "institution" can refer to a seller, vendor, or service provider, and such terms can be used interchangeably with "institution." However, embodiments are not limited to these particular types of institutions. The user 102 can notify presence, either through proximity sensors of a device or through a direct indication, e.g., pressing a button at the location. A system 108 associated with the location (either remote or local to the location, e.g., backend server corresponding to a retailer) can request user cooperation to collect user data. Further components of the system 108 and of user devices used by the user 102 will be described later herein with reference to FIG. 3.

Still referring to FIG. 1, the user 102 can agree to data collection of user data using various different forms. For example, a gesture with a smartwatch can trigger an accelerometer in the smart watch to provide an agreement message or communication using smart watch communication circuitry. As an additional example, waving or other gestures can be detected using the accelerometer, camera, etc. or language can be detected using a microphone of a user device. These methods provide an improvement over available systems in that agreement can be provided through natural human interaction rather than through QR codes or other website or text-based systems.

In operation 110, a communication channel (e.g., an interface) is established, wherein communication can occur using at least one of a cellular connection, a Wi-Fi connection, a Bluetooth connection, a near-field communication (NFC) connection, radio, GPS, ZigBee, satellite, Worldwide Interoperability for Microwave Access (WiMax), etc. At this point, the user 102 may select the parameters he or she is willing to share with the institution. This selection can be made on the wearable device or on a coupled smart phone screen or other extensor screens, for example, monitor screens and smart TV screens used with any type of user device etc. In alternatives, the institution, vendor, or service provider may request a certain number of parameters or biological features (e.g., blood pressure and heart rate) and the user 102 can select which of those he or she is willing to share. In examples, some business rules can be generated. For example, if the user 102 is willing to share X number of parameters, then Y incentives can be provided, wherein more incentive is provided if the user is willing to share more parameters.

The incentive can take various forms, including for example special/premium services, discounts, bonuses, access privileges, customizations (e.g., music provided on a user interface (UI) or user experience (UX), surrounding music, etc.) based on user 102 preferences or profile, etc. Incentives could also include parameters or settings specific to a user context or environment such as enabling an improved or enhanced room temperature control (with skin temperature from user 102 as a clue for temperature control). In some examples, pre-defined ambient temperatures or other ambient parameters including humidity, etc. can be identified and stored with a user wearable device system profile. Other incentives can include providing improved experiences for collecting inputs (or conducting interactive surveys) from audiences in concerts, lectures, talk shows, or other venues or events.

At operation 112, a device (e.g., a wearable) belonging to the user 102 can activate sensing and storage of data and begin sending data using the connection provided in operation 112 to the system 108. The system 108 may perform processing functionalities as described above for institution 114, which can in turn correspond to geographic location 106 (although embodiments are not limited to a particular geographic location and can include for example, systems remotely located relative to the user 102). The system 108 can commence anonymization (using, e.g., data aggregation) as described below to ensure user data privacy.

For example, the system 108 can make use of zero knowledge circuits to prove to a verifier (e.g., the user 102, government agency/privacy watchdog, etc.) that the system 108 (or respective associated institution 114) is collecting the data from a given user without knowing the specific data that is being transmitted. Zero-knowledge circuits may allow a prover (in embodiments, the system 108 and/or associated institution 114) to use a zero-knowledge construction to demonstrate that, given a certain set of inputs, the prover has correctly executed the calculations without revealing any of the inputs. In a broader sense, zero-knowledge proofs can prove possession of knowledge without revealing the facts (in the case of embodiments, a given user's data) behind that knowledge. Thus, the system 108 may also notify the user 102 that such technology is being used (thereby making the process transparent to the user and thus enhancing trust levels of the user) revealing calculations that the user can verify by himself or herself that privacy has not been breached. In this manner, the user can be reassured that no personal knowledge has been revealed to the institution/service provider.

Figure 2:
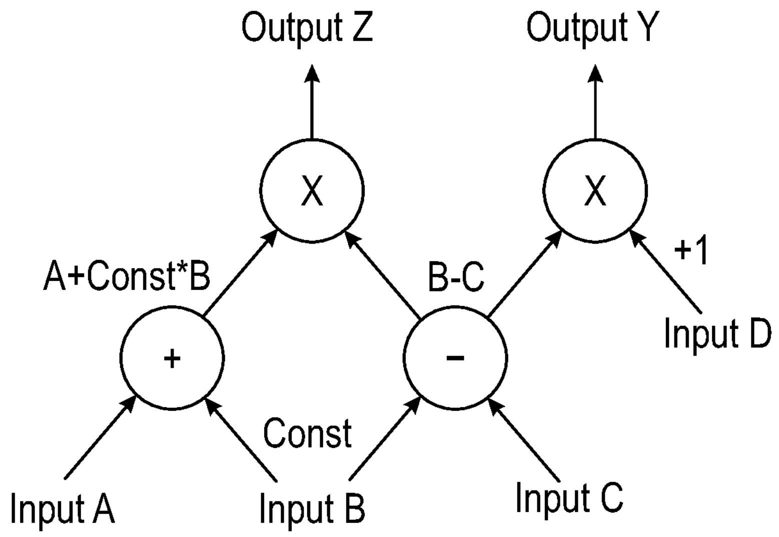
FIG. 2 is an example of a zero-knowledge circuit in which example embodiments can be implemented.

FIG. 2 is an example of a zero-knowledge circuit in which example embodiments can be implemented. Inputs A, B and C can be provided to the zero-knowledge circuit and can include user data from many different users (for example, multiple different heartbeats, pulses, etc.). While numerical values are described, aggregation can occur over several types of data including, but not limited to: digital values, selected option/checklist values and text values. In some examples, non-numerical values are first converted to numerical values before further aggregation or other processing takes place. Inputs A, B and C are combined in operations at a next tier as shown. For example, inputs A and B can be combined with a constant in an addition operation and inputs B and C can be combined in a subtraction operation. Further combinations can be performed before generating outputs Z and Y. At the point outputs Z and Y are provided, inputs A, B and C are not known, therefore maintaining anonymity of user data or of any specific user's data.

Zero-knowledge circuitry can be implemented using elliptic curve cryptography (ECC). For example, given any individual value provided by a user 102 (e.g., a user who has agreed to provide wearable device data as described above), the individual data is mapped to an elliptical curve and a public key or other value is provided. Once that key or value is given, the individual user's data is not recoverable or determinable, and therefore the data collector can prove that he or she has zero knowledge of an individual user's data.

Figure 3:
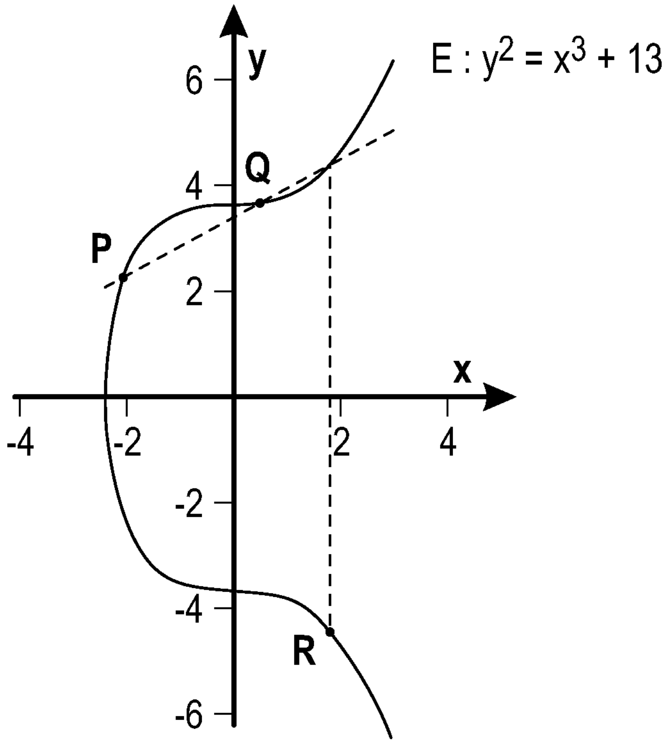
FIG. 3 illustrates elliptical curve cryptography.
Figure 5:
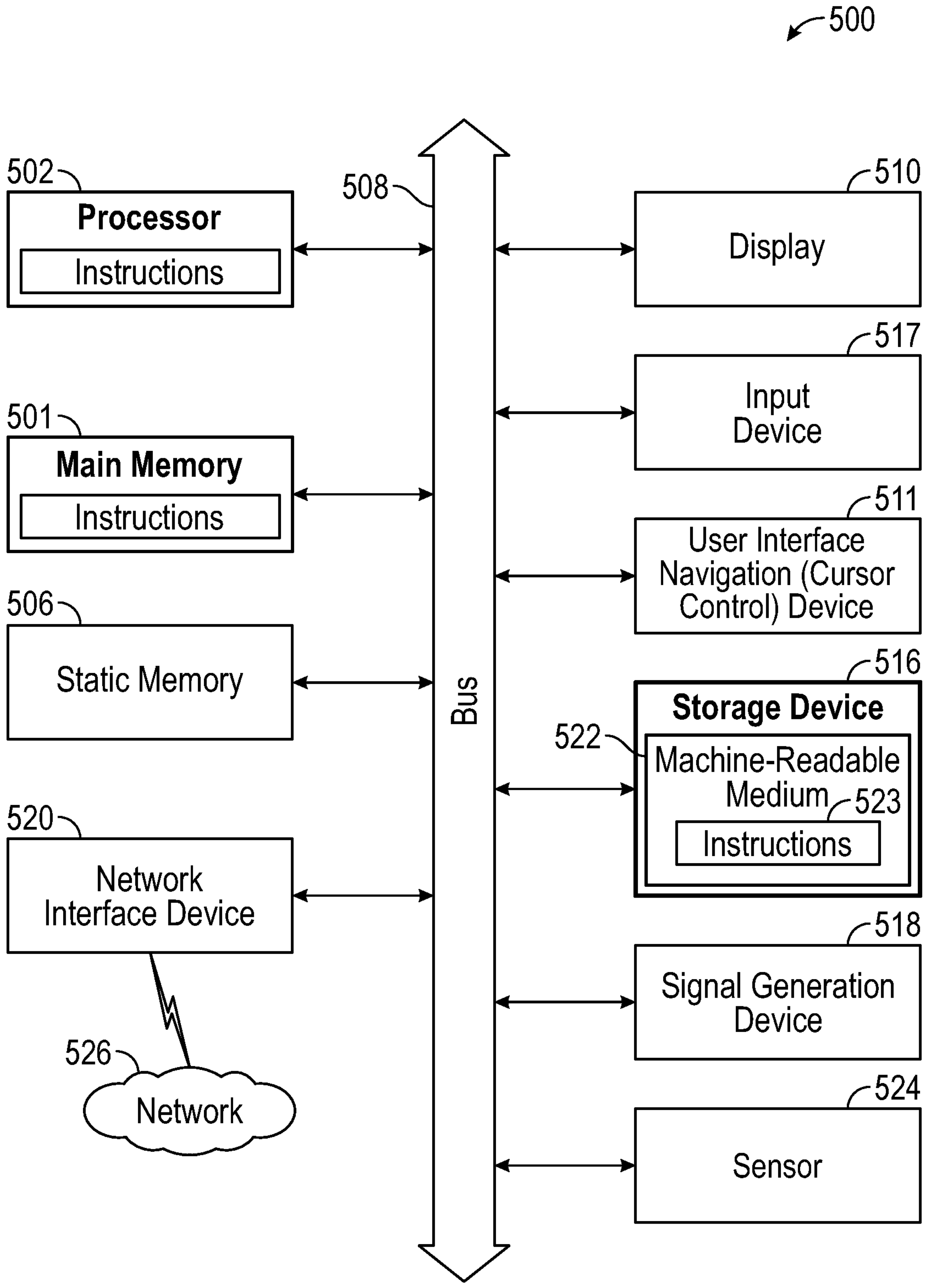
FIG. 5 is a block diagram of a computer architecture upon which one or more of the embodiments disclosed herein can execute.

ECC is executed as described with reference to FIG. 3. First, the data collector (e.g., system 108 associated with an institution) can set or determine the number of users that the data collector is interested in evaluating. Next, aggregation can begin with a base value p1 mapped to elliptic curve point P1 and random value r1 mapped to point R1. An equation defining this elliptical curve is defined by an aggregation service that performs aggregation executed in, for example, the processor 502 (FIG. 5). The processor 502 or other apparatus can be included at an institution 114 (wherein the institution can include a vendor service provider although embodiments are not limited thereto). The processor 502 (or other device or circuitry) can be implemented in or correspond to remote cloud services or microservices, controlled by a centralized trusted authority or trusted party or partner. Other entities can include data centers, certificate management entities, cloud computing services, web applications, and 5G environments in edge computing. Internet-of-Things (IoT) management platforms, IoT devices, or wearable devices, although embodiments are not limited thereto. As each new value q is provided (e.g., by each new user 102 agreeing to provide data), the aggregation service maps that new value q to the elliptical curve to provide a value Q. The aggregation service can provide a new point that is a sum of ECC points Pi+1=Pi+Qi+Ri, where Pi is an already-aggregated value and Ri is random point aggregation. The aggregation service can also provide an aggregated value for random points and therefore an aggregated Pi+1 and Ri+1 is returned to the collector. From n values provided (from, e.g., n user devices), the data collector can determine an average value S according to: S=(Pn−Rn)*1/n and compare this average against range values. As can be seen from the above discussion, the collector only keeps or has access to the last aggregated value Pn and aggregated random ECC points Ri. This anonymous schema allows the collector to learn and verify aggregated values without learning specific sensitive data. Therefore, the collector can determine whether the average value is within a specific boundary, or other characteristics of the aggregated data, without having knowledge of any individual user's data.

The above aggregation can be applied to user data that includes selections of responses to a text-based question or questionnaire. For example, aggregation can be applied to questionnaires wherein the user's selection is made as a selection of options. Specific numerical values can be assigned to each of the options in the checklist, and those values can be provided to the aggregation service similarly to methods described above. The aggregation and calculation can help the data collector learn a target market response to the questionnaire or question being posed without being able to tie any particular response to any given user.

The above aggregation can be applied to user data that includes textual responses. Values in the response can be normalized and hashed before transforming to an ECC point. The collector may store points with a counter number until a preset large number is stored. The collector then can generate a signed cryptographic commitment that he has, for example, 1,000 devices with a specific text value. This specific value can be disclosed and is no longer considered anonymous. Alternatively, known ECC points can be disclosed, which map against the specific value/s.

Referring again to FIG. 1, a user 102 can disconnect or pause sharing at operation 116. The user 102 can disconnect by canceling using the user interface of a device or other button or element; by leaving the environment or space 106, by denying the terms of sharing, or by shutting down his or her equipment or wearable devices.

At operation 118, the user 102 can receive an incentive. For example, the user 102 can receive a token/receipt for a benefit/reward agreed upon for the corresponding broadcast or sharing, based on a predefined business rule. The broadcasting service can be shut down until a next engagement informing of an openness to broadcast user data.

Any of the above methods and systems for anonymizing user sensor/wearable device data can be used for providing customized incentives to users. Example data collectors or geographical locations (and associated institutions) can include stores/shopping centers (where discounts or customized services can be provided as an incentive); stages (occupation, security, exit planning, etc.); traffic signals where user presence and user notification is important; shows/concert halls (where user information may be useful for producers and engineers); environmental comfort improvement (where user vital signs or collective user vital signs is important); and in conferences or lectures (to provide question/answer support, audio recordings, etc.).

Figure 4:
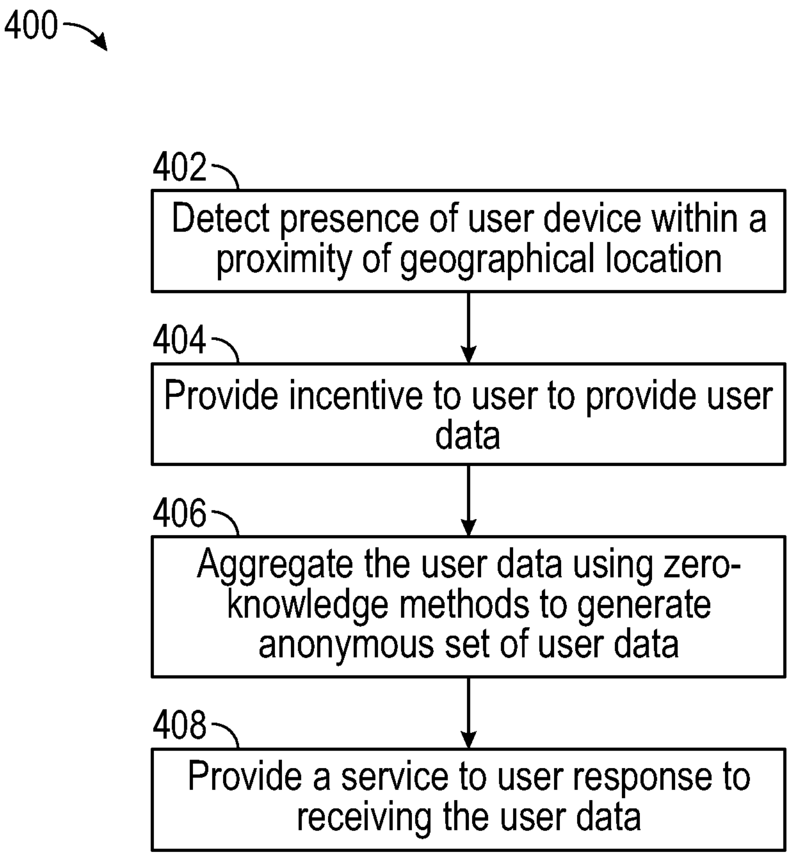
FIG. 4 is a flowchart of a method for receiving and using anonymized user data.

FIG. 4 is a flowchart of a method 400 for receiving and using anonymized user data. The method 400 can be performed by a processor or other component of system 108 (FIG. 1) or by a subcomponent of such system 108 as shown in FIG. 5. The method 400 can begin with operation 402 with detecting presence of a user device within a proximity of a geographical location. The detection can be done using proximity sensors, Bluetooth, etc. as described above.

The method 400 can continue with operation 404 by requesting user data by providing an incentive to a user of the user device to provide user data. The incentive may relate to a financial benefit or a comfort benefit at the geographical location or at a different geographical location, or online, contemporaneously with the user being present at the geographical location or at a later time. The method 400 can include generating a request to the user device for permission to access the user data and retrieving user data upon receiving permission in response to the request. The method 400 can include detecting a response to the request and selecting at least one sensor output of the user device from which data is to be collected.

The method 400 can continue with operation 406 by aggregating the user data, based on a response to the incentive, with data of other user devices to generate an anonymous set of user data. The user data can include physiological data captured by the user device. The data can include numerical values, multiple option response values, or text values.

The method 400 can continue with operation 408 by providing a service to a user of the user device in response to receiving the user data. The service can be provided at the geographical location where the user 102 was detected, although embodiments are not limited thereto.

The method 400 can include providing an indication that the user data has been aggregated without identifying user data. The indication can include a zero-knowledge proof as described earlier herein with reference to FIG. 2 and FIG. 3. In some examples, the indication can be based on ECC as described with reference to FIG. 3. Connections can be established with the user device as described earlier herein using at least one of a cellular connection, a Wi-Fi connection, a Bluetooth connection, and a near-field communication (NFC) connection.

FIG. 5 is a block diagram illustrating a computing and communications platform 500 in the example form of a general-purpose machine on which some or all the operations of FIGS. 1-4 may be carried out according to various embodiments. In certain embodiments, programming of the computing platform 500 according to one or more particular algorithms produces a special-purpose machine upon execution of that programming. In a networked deployment, the computing platform 500 may operate in the capacity of either a server or a client machine in server-client network environments, or it may act as a peer machine in peer-to-peer (or distributed) network environments. The computing platform 500 can include components of wearable user devices or other portable or mobile user devices. In some embodiments, the computing platform 500 can include components of the system 108 (FIG. 1) associated with an institution 114 with which the user 102 is interacting.

Example computing platform 500 includes at least one processor 502 (e.g., a central processing unit (CPU), a graphics processing unit (GPU) or both, processor cores, compute nodes, etc.), a main memory 501 and a static memory 506, which communicate with each other via a link 508 (e.g., bus). The computing platform 500 may further include a video display unit 510, input devices 517 (e.g., a keyboard, camera, microphone), and a user interface (UI) navigation device 511 (e.g., mouse, touchscreen). The computing platform 500 may additionally include a storage device 516 (e.g., a drive unit), a signal generation device 518 (e.g., a speaker), a sensor 524, and a network interface device 520 coupled to a network 526.

The storage device 516 includes a non-transitory machine-readable medium 522 on which is stored one or more sets of data structures and instructions 523 (e.g., software) embodying or utilized by any one or more of the methodologies or functions described herein. The instructions 523 may also reside, completely or at least partially, within the main memory 501, static memory 506, and/or within the processor 502 during execution thereof by the computing platform 500, with the main memory 501, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 523. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B." unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

EXAMPLES

Example 1 is a method comprising: detecting presence of a user device within a proximity of a geographical location; requesting user data by providing an incentive to a user of the user device to provide user data; aggregating the user data, based on a response to the incentive, with data of other user devices to generate an anonymous set of user data; and providing a service to a user of the user device in response to receiving the user data.

In Example 2, the subject matter of Example 1 can optionally include providing an indication that the user data has been aggregated without identifying user data.

In Example 3, the subject matter of Example 2 can optionally include wherein the indication includes a zero-knowledge proof.

In Example 4, the subject matter of Example 3 can optionally include wherein the indication is based on an elliptic curve cryptography (ECC).

In Example 5, the subject matter of any of Examples 1-4 can optionally include wherein the service is provided at the geographical location.

In Example 6, the subject matter of Example 5 can optionally include wherein the incentive relates to a financial benefit or a comfort benefit at the geographical location.

In Example 7, the subject matter of Example 2 can optionally include wherein the incentive relates to a benefit at a different geographical location.

In Example 8, the subject matter of any of Examples 1-7 can optionally include generating a request to the user device for permission to access the user data; and retrieving user data upon receiving permission in response to the request.

In Example 9, the subject matter of any of Example 8 can optionally include detecting a response to the request, and selecting at least one sensor output of the user device from which data is collected.

In Example 10, the subject matter of any of Examples 1-9 can optionally include wherein the user data includes physiological data captured by the user device.

In Example 11, the subject matter of any of Examples 1-10 can optionally include wherein the data includes one or more of numerical values, multiple option response values, and text values.

In Example 12, the subject matter of Example 11 can optionally include wherein when the user data includes text values the method further comprises converting the text values to numerical values before aggregation of the numerical values.

In Example 13, the subject matter of any of Examples 1-12 can optionally include establishing a connection with the user device, wherein the connection includes at least one of a cellular connection, a Wi-Fi connection, a Bluetooth connection, and a near-field communication (NFC) connection.

Example 14 is a system comprising means for performing any of Examples 1-13.

Example 15 is a user device including means for performing any of Examples 1-13.

The invention claimed is:

1. A system comprising:

a communications interface configured to broadcast to user devices within a geographical location; and processing circuitry coupled to the communications interface and configured to:

generate a request, over the communications interface, for permission to access user data;

provide an incentive, over the communications interface, to a user of the user device to provide the user data;

provide the user the ability to select the user data the user is willing to provide;

retrieve the user data upon receiving the permission in response to the request;

aggregate the user data with data of other user devices using zero-knowledge methods to generate an anonymous set of user data;

compute and provide an indication that the user data has been aggregated without identifying the user data, wherein the indication includes a zero-knowledge proof based on an elliptic curve cryptography (ECC), wherein the processing circuitry is configured to provide the indication to at least one of the user device and a governmental agency; and provide at least one of a service, product, or benefit to a user of the user device in response to receiving the user data as a function of an amount of user data selected by the user to provide;

wherein an amount of service, product, or benefit provided is a function of the selection of user data willing to be provided.

2. The system of claim 1, wherein the data includes one or more of numerical values, multiple option response values, and text values and wherein when the user data includes text values the processing circuitry is configured to generate numerical values base on the text values before aggregation.

3. The system of claim 1, wherein the communications interface is configured to communicate using at least one of a cellular connection, a Wi-Fi connection, a Bluetooth connection, and a near-field communication (NFC) connection.

* * * * *